(12) United States Patent
Minami et al.

(10) Patent No.: US 10,875,564 B2
(45) Date of Patent: Dec. 29, 2020

(54) STEERING WHEEL STRUCTURE

(71) Applicants: ASHIMORI INDUSTRY CO., LTD., Osaka (JP); MAZDA MOTOR CORPORATION, Hiroshima (JP)

(72) Inventors: Yuta Minami, Settsu (JP); Hidenori Higo, Settsu (JP); Kenichi Yukumatsu, Hiroshima (JP); Hideharu Kaeriyama, Hiroshima (JP)

(73) Assignees: ASHIMORI INDUSTRY CO., LTD., Osaka (JP); MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 16/492,269

(22) PCT Filed: Feb. 8, 2018

(86) PCT No.: PCT/JP2018/004292
§ 371 (c)(1),
(2) Date: Sep. 9, 2019

(87) PCT Pub. No.: WO2018/163698
PCT Pub. Date: Sep. 13, 2018

(65) Prior Publication Data
US 2020/0331511 A1  Oct. 22, 2020

(30) Foreign Application Priority Data
Mar. 10, 2017 (JP) ................................. 2017-045625

(51) Int. Cl.
*B62D 1/04* (2006.01)
*B60R 21/203* (2006.01)

(52) U.S. Cl.
CPC ............ *B62D 1/04* (2013.01); *B60R 21/2037* (2013.01)

(58) Field of Classification Search
CPC .... B62D 1/04; B62D 1/10; B62D 1/11; B60R 21/203; B60R 21/2035; B60R 21/2037
See application file for complete search history.

(56) References Cited

U.S. PATENT DOCUMENTS 5,087,069 A * 2/1992 Corbett ............... B60R 21/2035
                                                    280/731
6,257,615 B1 * 7/2001 Bohn ..................... B60Q 5/003
                                                    200/61.54
(Continued)

FOREIGN PATENT DOCUMENTS

JP    2001-233159 A    8/2001
JP    2009-202859 A    9/2009
(Continued)

OTHER PUBLICATIONS

International Search Report issued in PCT/JP2018/004292; dated Apr. 24, 2018.

*Primary Examiner* — Richard W Ridley
*Assistant Examiner* — Brian J McGovern
(74) *Attorney, Agent, or Firm* — Studebaker & Brackett PC

(57) ABSTRACT

A steering wheel structure includes: a guide member (30) that is formed into a tubular shape, and attached to a mounting hole (12a) formed in a mounting plate (12) of an airbag module (10); a hook member (2) that is formed in a steering wheel (1), and is inserted into the guide member (30); a damper rubber (20) that is interposed between an edge portion of the mounting hole (12a) in the mounting plate (12), and the guide member (30); and a lock spring (40) that is attached to the guide member (30). The lock spring (40) is engaged with the hook member (2) inserted into the guide member (30) so as to prevent the hook member (2) from coming-off from the guide member (30).

11 Claims, 16 Drawing Sheets

(56) References Cited

U.S. PATENT DOCUMENTS

| | | | | |
|---|---|---|---|---|
| 6,312,012 B1* | 11/2001 | Bohn | ................. | B60Q 5/003 |
| | | | | 200/61.54 |
| 2001/0054810 A1* | 12/2001 | Sakane | .............. | B60R 21/2037 |
| | | | | 280/728.2 |
| 2006/0055154 A1* | 3/2006 | Salmon, III | ........ | B60R 21/2035 |
| | | | | 280/728.2 |
| 2009/0218739 A1* | 9/2009 | Terada | ................ | B62D 7/222 |
| | | | | 267/2 |
| 2014/0131982 A1 | 5/2014 | Ishii et al. | | |
| 2015/0210308 A1* | 7/2015 | Onohara | ................ | B60Q 5/003 |
| | | | | 200/61.54 |
| 2016/0031480 A1 | 2/2016 | Ishii et al. | | |
| 2017/0021792 A1* | 1/2017 | Kim | ..................... | B60Q 5/003 |
| 2017/0088171 A1 | 3/2017 | Ishii et al. | | |

FOREIGN PATENT DOCUMENTS

| | | | |
|---|---|---|---|
| JP | 2013-082283 A | 5/2013 | |
| JP | 2014-111426 A | 6/2014 | |
| JP | 2015-145173 A | 8/2015 | |
| JP | 2016-028963 A | 3/2016 | |
| JP | 2016-030552 A | 3/2016 | |

* cited by examiner

STEERING WHEEL STRUCTURE

TECHNICAL FIELD

The present invention relates to a steering wheel structure.

BACKGROUND ART

An air bag for a driver seat is generally mounted on a boss portion of a steering wheel after being modularized. As a method for mounting the modularized air bag for the driver seat (hereinafter, referred to as an airbag module) on the steering wheel, there has been known a method called a snap-in method, in which mounting is easy. Moreover, in order to implement a dynamic damper function of reducing vibration of the steering wheel during traveling, elastically mounting the airbag module as a mass body on the steering wheel is also performed.

In Patent Literature 1 and Patent Literature 2, there have been disclosed techniques in each of which an airbag module is mounted on a steering wheel by the snap-in method while implementing the dynamic damper function.

In the technique of each of the patent literatures, a mechanism is considerably complicated, and a number of required parts is large, so that in these respects, countermeasures have been desired, the mechanism being configured to mount the airbag module on the steering wheel by the snap-in method while implementing the dynamic damper function.

CITATION LISTS

Patent Literatures

Patent Literature 1: Japanese Patent Application Laid-Open No. 2016-28963
Patent Literature 2: Japanese Patent Application Laid-Open No. 2016-030552

SUMMARY OF INVENTION

The present invention is achieved in light of the above-described situation, and an object thereof is to provide a steering wheel structure in which with a simple mechanism having a smaller number of parts, an airbag module can be mounted on a steering wheel by a snap-in method while implementing a dynamic damper function.

The present invention for achieving the above-described object is a steering wheel structure including a steering wheel and an airbag module mounted on the steering wheel, the steering wheel structure including: a guide member that is formed into a tubular shape, and attached to a mounting hole formed in a mounting plate of the airbag module; a hook member that is formed in the steering wheel, and is inserted into the guide member; a damper rubber that is interposed between an edge portion of the mounting hole in the mounting plate, and the guide member; and a lock spring that is attached to the guide member, wherein the lock spring is engaged with the hook member inserted into the guide member so as to prevent the hook member from coming-off from the guide member.

DESCRIPTION OF EMBODIMENTS

Figure 1:
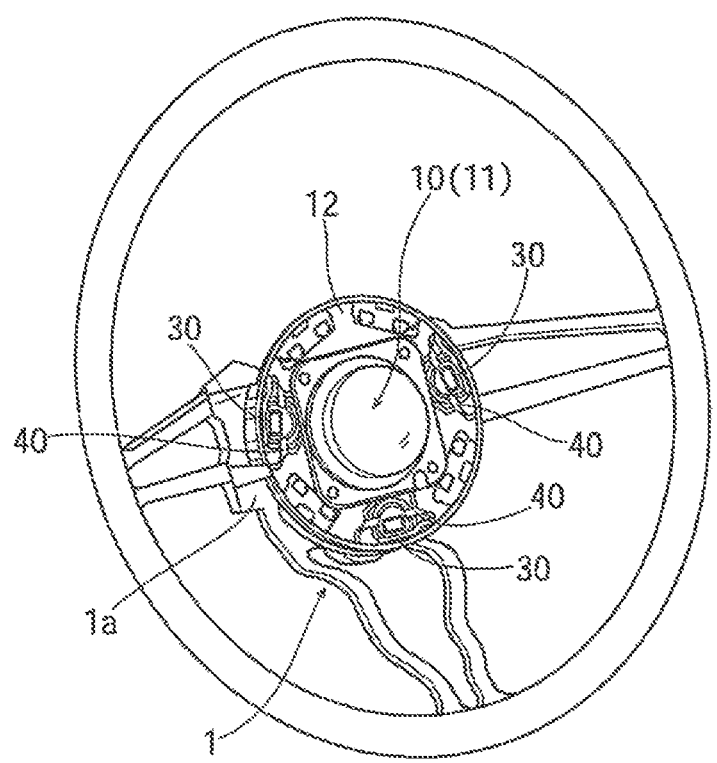
FIG. 1 is a perspective view showing a state where an airbag module is mounted on a core metal of a steering wheel.

In FIG. 1, reference sign 1 denotes a core metal of a steering wheel. The core metal 1 has a boss portion 1a. An airbag module 10 is mounted on the boss portion 1a as follows.

Figure 3:
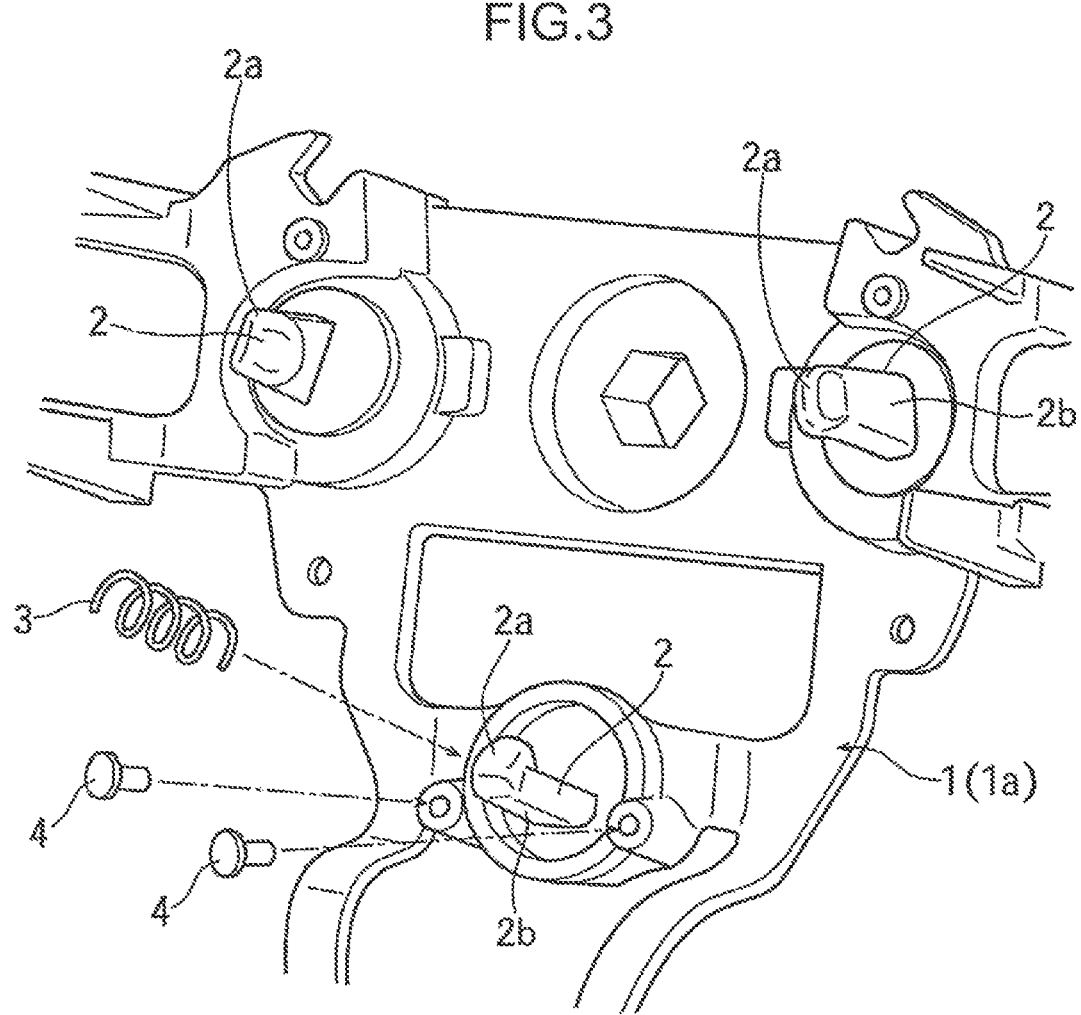
FIG. 3 is a perspective view showing a core metal portion of the steering wheel formed with hook members.

As shown in FIG. 3, in the boss portion 1a of the steering wheel (core metal 1), a plurality of (in this embodiment, three) hook members 2 are formed so as to project rearward (rearward in a state where the steering wheel is assembled to a vehicle). Each of the hook members 2 is formed integrally with the core metal 1, for example, by casting. Each of the hook members 2 has an enlarged distal end 2a having a tapered shape. These enlarged distal ends 2a function as locking claws. Moreover, of side surfaces of each of the hook members 2, a side surface at a predetermined circumferential position is formed as a flat surface 2b.

A return spring 3 made of a coil spring is attached to an outer circumference of the hook member 2. Coming-off of the return spring 3 from the hook member 2 is regulated by the enlarged distal end 2a of the hook member 2. Moreover, at predetermined positions of the boss portion 1a, horn sensors 4 are held.

Figure 2:
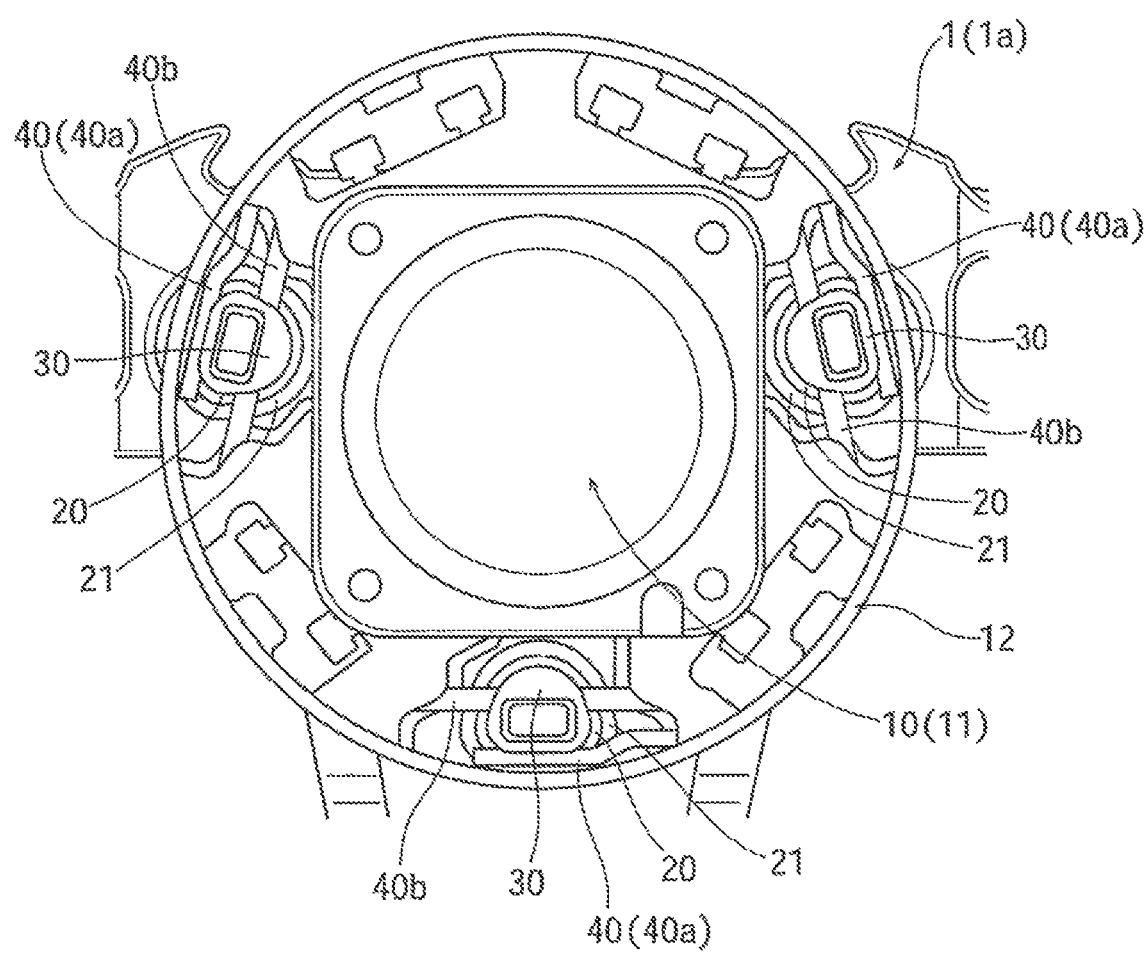
FIG. 2 is an essential part enlarged view when the state where the airbag module is mounted on the core metal of the steering wheel is seen from a driver seat side.

As shown in FIGS. 1 and 2, the airbag module 10 has a main body 11, and a mounting plate 12 integrated with the main body 11. An inflator and a folded air bag are contained in the main body 11. The mounting plate 12 is a mounting portion of the airbag module 10 on the steering wheel (core metal 1).

Figure 4:
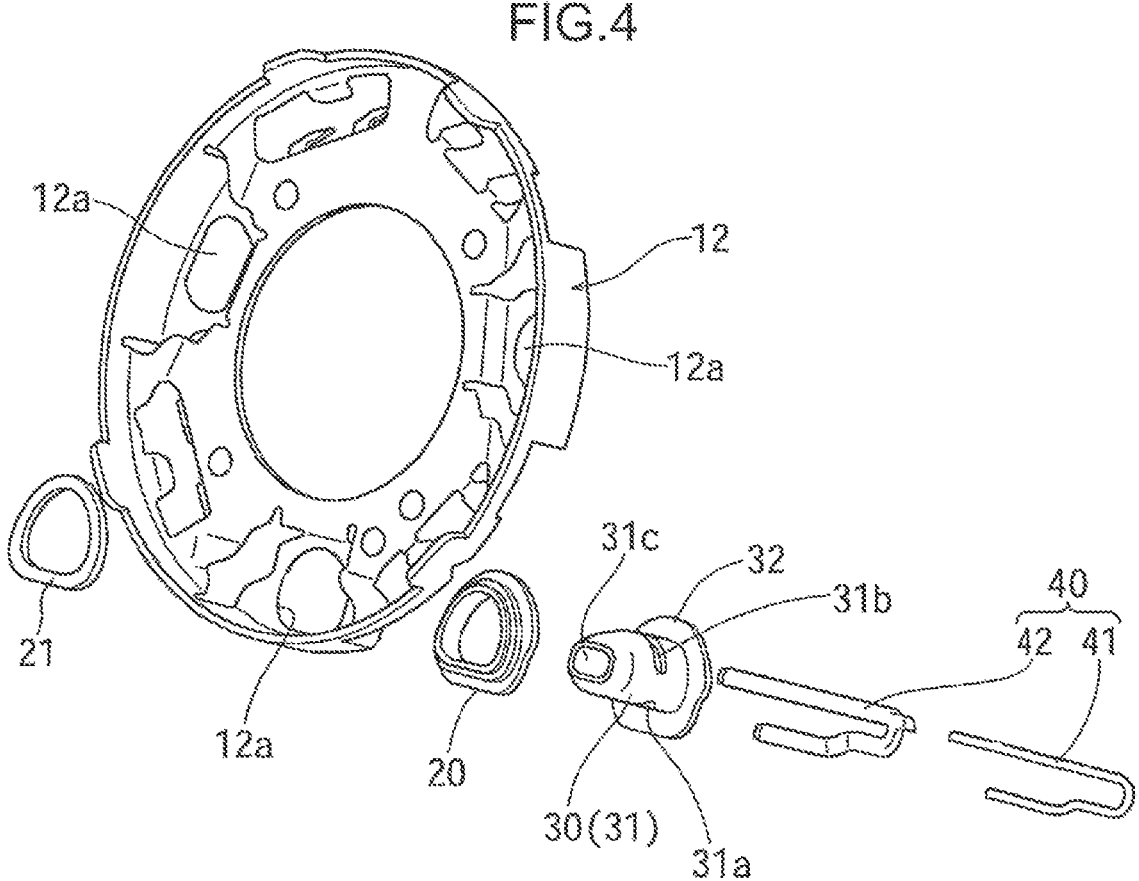
FIG. 4 is an exploded perspective view of parts to be mounted on an airbag module side.
Figure 5:
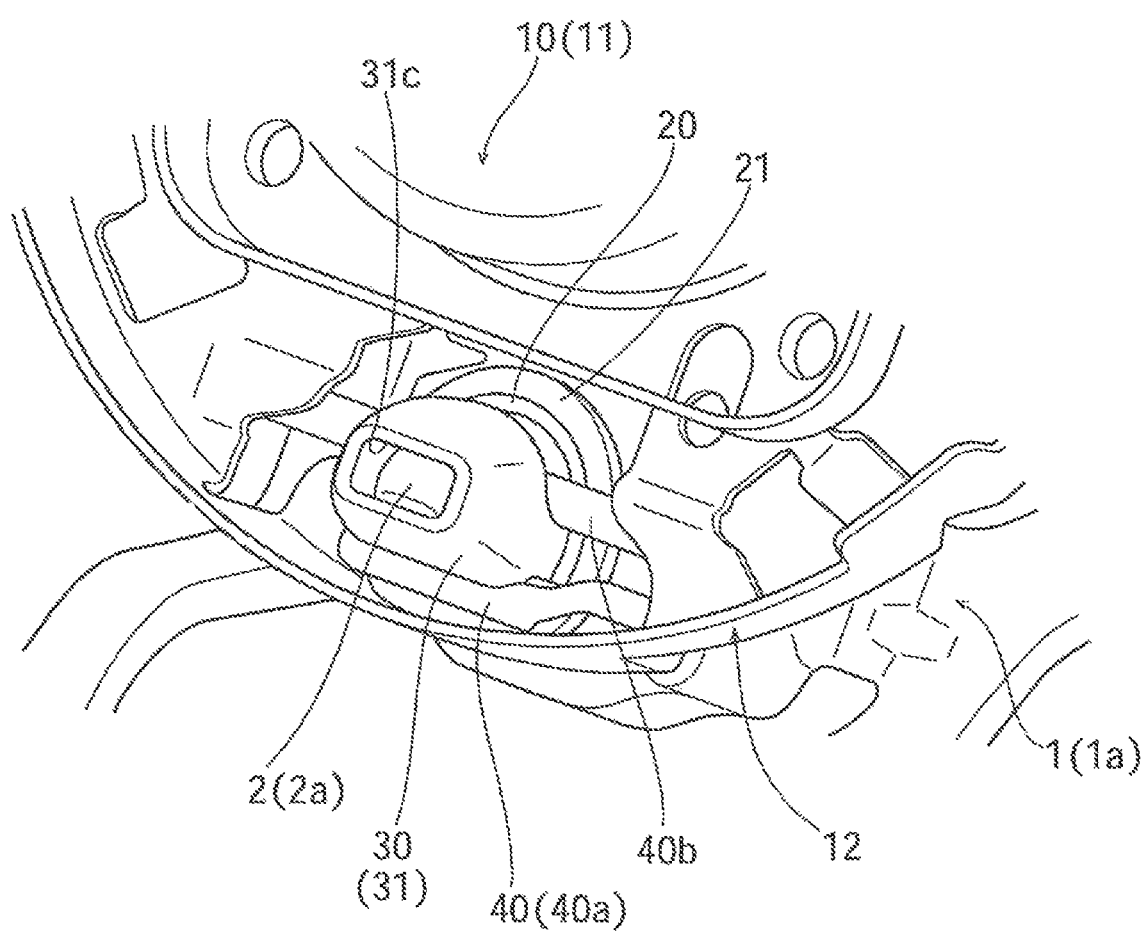
FIG. 5 is an enlarged perspective view showing a region where the steering wheel and the airbag module are mounted.
Figure 6:
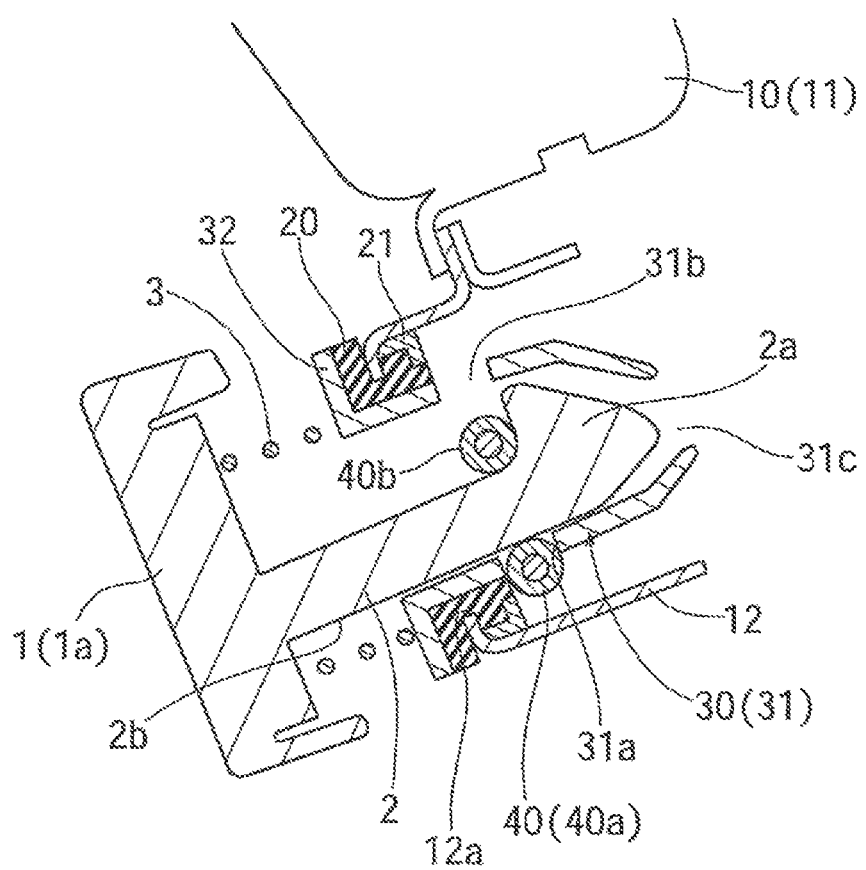
FIG. 6 is a side cross-sectional view showing a state where the hook member inserted into a guide member is locked by the lock spring, in which the airbag module is at a retreated position.
Figure 8:
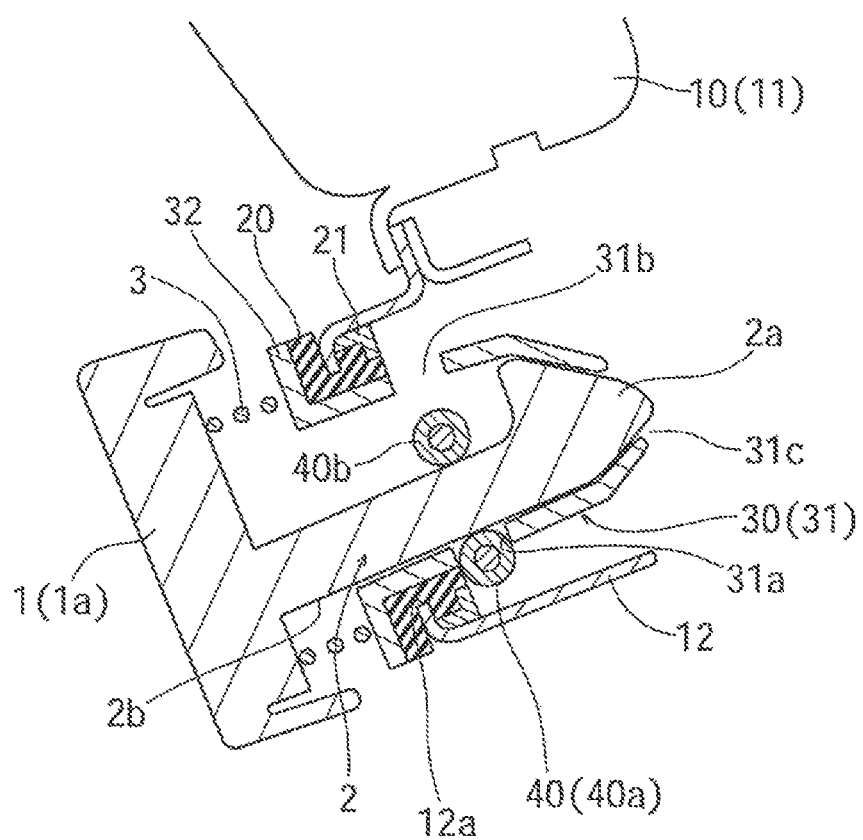
FIG. 8 is a side cross-sectional view showing a state where the hook member inserted into the guide member is locked by the lock spring, in which the airbag module is at an advanced position.

As shown in FIG. 4, the mounting plate 12 is formed with a plurality of (in the present embodiment, three) mounting holes 12a corresponding to the hook members 2. An annular damper rubber 20 is fitted and held in each of the mounting holes 12a, as shown in FIGS. 4, 6, and 8. An annular spacer 21 made of, for example, a metal or a hard synthetic resin is fitted on an outer circumference of this damper rubber 20. The spacer 21 limits excessive vibration of the damper rubber 20, and regulates elastic deformation or displacement of the damper rubber 20 in a diameter-expanding direction of the damper rubber 20.

Figure 11:
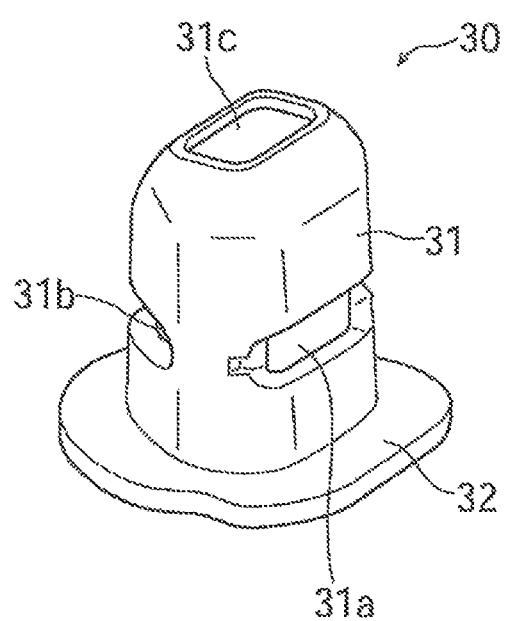
FIG. 11 is a perspective view of the guide member.
Figure 12:
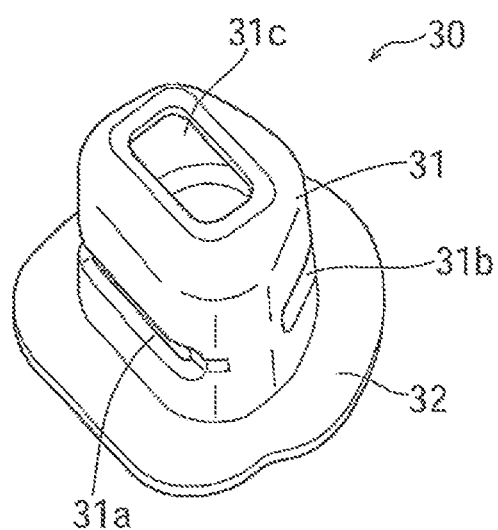
FIG. 12 is a perspective view when the guide member is seen from another direction from that in FIG. 11.

A tubular guide member 30 into which the hook member 2 is inserted is held by the mounting hole 12a. Details of the guide member 30 are shown in FIGS. 4, 11, and 12. The guide member 30 has a main body 31 and a flange 32, the main body 31 being insertable in the damper rubber 20 without rattling and the flange 32 being formed on one end of the main body 31. When the main body 31 is inserted into the damper rubber 20 from a front side (steering wheel side), the flange 32 abuts on an edge portion (front end surface of the damper rubber 20) of the mounting hole 12a, by which further insertion is regulated.

Both side surfaces of the main body 31 of the guide member 30 are formed with holding holes 31a, 31b for holding a lock spring described later, respectively. Moreover, the main body 31 is formed into a hollow tubular shape so as to cover the distal end of the inserted hook member 2, and in a distal end of the main body 31 (an end portion on an opposite side to the flange 32), an opening 31c is formed.

Figure 10:
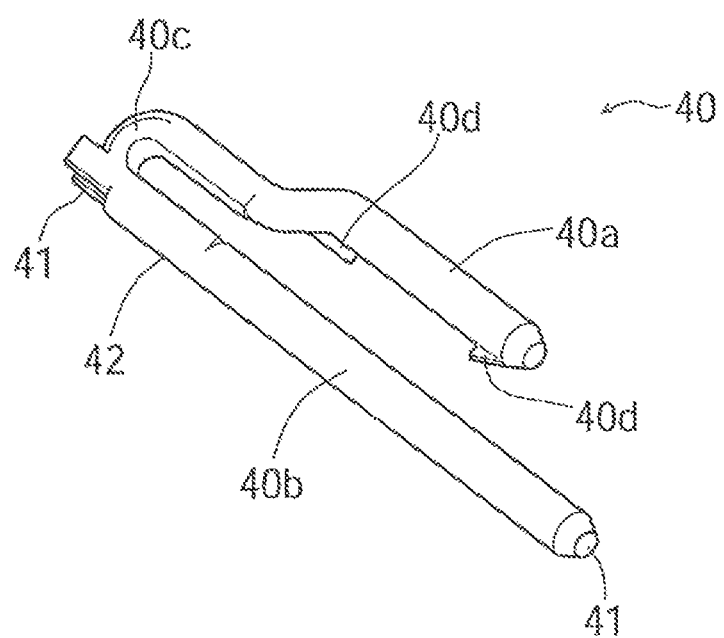
FIG. 10 is a perspective view showing one example of the lock spring.
Figure 13:
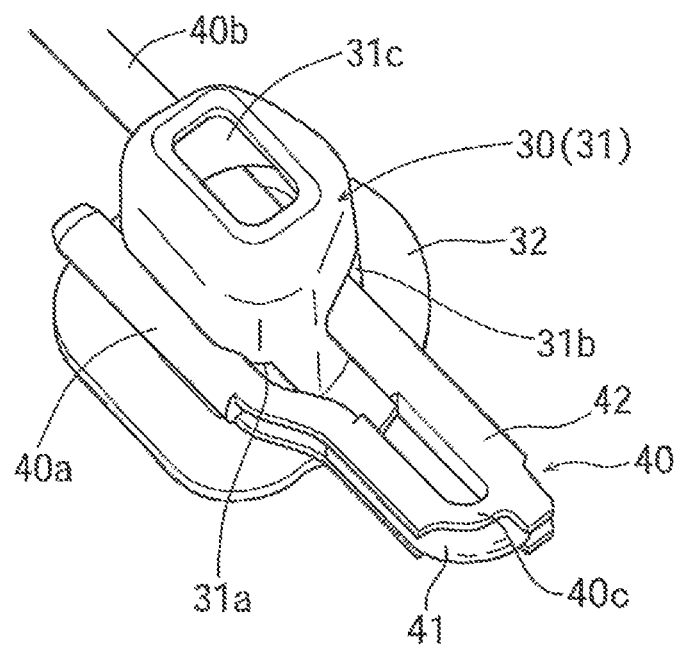
FIG. 13 is perspective view showing a state where the lock spring is attached to the guide member.
Figure 14:
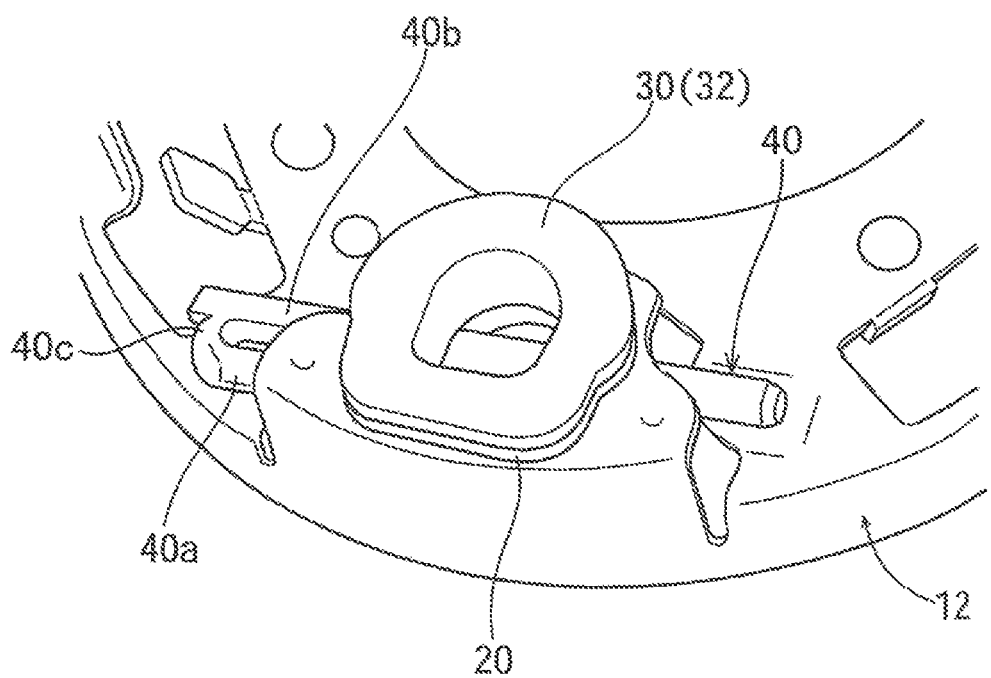
FIG. 14 is a perspective view showing an assembled state of the guide member and the lock spring to the airbag module.

In the mounting plate 12, a lock spring 40 is held by utilizing the guide member 30. The lock spring 40 is disposed at a position on an opposite side to the flange 32 of the guide member 30 with the mounting plate 12 interposed. In the present embodiment, as shown in FIGS. 10 and 13, the lock spring 40 is configured of a core material 41 and a covering material 42, the core material 41 being formed by bending a spring material into a U shape, and the covering material covering the core material 41 almost entirely. The covering material 42 is formed of, for example, a soft or hard synthetic resin.

The lock spring 40 made of the core material 41 and the covering material 42 has a pair of rod-shaped portions 40a, 40b opposed to each other, and a bent connecting portion 40c that connects one ends of the pair of rod-shaped portions 40a, 40b. The pair of rod-shaped portions 40a, 40b are formed so as to extend parallel to each other, and formed so that the other rod-shaped portion 40b is longer than the one rod-shaped portion 40a. In the one rod-shaped portion 40a, a pair of locking claws 40d are formed integrally with the covering material 42, the pair of locking claws 40d being disposed at an interval in a longitudinal direction thereof.

As shown in FIGS. 6, 8, and 13, the pair of rod-shaped portions 40a, 40b are engaged with the main body 31 of the guide member 30. Specifically, the one rod-shaped portion 40a is partially inserted into the holding hole 31a of the main body 31. In this inserted state, the main body 31 is sandwiched and held in a radial direction between the pair of locking claws 40d (FIG. 10) of the rod-shaped portion 40a. In this manner, the locking claws 40d are engaged with the main body 31, by which the pair of rod-shaped portions 40a, 40b regulate relative displacement in the longitudinal direction thereof to the main body 31.

The other rod-shaped portion 40b of the lock spring 40 is inserted into the holding hole 31b of the main body 31. In this inserted state, the rod-shaped portion 40b is disposed so as to pass through an inside of the main body 31, and largely project outside of the main body 31. That is, the rod-shaped portion 40b is disposed so as to penetrate the main body 31, and intersect with the hook member 2 inside the main body 31.

In a state where no external force is received, an interval between the pair of rod-shaped portions 40a, 40b is set to be smaller than a maximum width of the enlarged distal end 2a of the hook member 2, and to be slightly larger than a width of a base end portion (portion excluding the enlarged distal end 2a) of the hook member 2 in a direction perpendicular to the flat surface 2b. The rod-shaped portions 40a, 40b are inserted into the holding holes 31a, 31b with a slight gap so that the lock spring 40 can slightly move with respect to the guide member 30.

Next, a procedure for mounting the airbag module 10 on the steering wheel will be described. As an advance preparation of the mounting, the damper rubber 20, the spacer 21, the guide member 30, the lock spring 40 are assembled to the mounting plate 12 of the airbag module 10 in advance. Moreover, on the steering wheel side, the return spring 3 is attached to the hook member 2, and the horn sensors 4 are fixed to the boss portion 1a.

In a state where the foregoing advance preparation is completed, the airbag module 10 is brought close to the core metal 1 of the steering wheel, and the hook member 2 is inserted into the guide member 30.

Accompanying the insertion of the hook member 2 into the guide member 30, the enlarged distal end 2a of the hook member 2 goes over the pair of rod-shaped portions 40a, 40b of the lock spring 40. That is, the enlarged distal end 2a moves rearward with respect to the rod-shaped portions 40a, 40b while elastically deforming the lock spring 40 so as to widen the interval between the pair of rod-shaped portions 40a, 40b. At a time when the enlarged distal end 2a goes over the rod-shaped portions 40a, 40b, the lock spring 40 returns to a state where the interval between the pair of rod-shaped portions 40a, 40b is narrowed by an elastic restoring force thereof. Thereby, the lock spring 40 is engaged with the enlarged distal end 2a, and coming-off of the hook member 2 from the guide member 30 is prevented.

Figure 7:
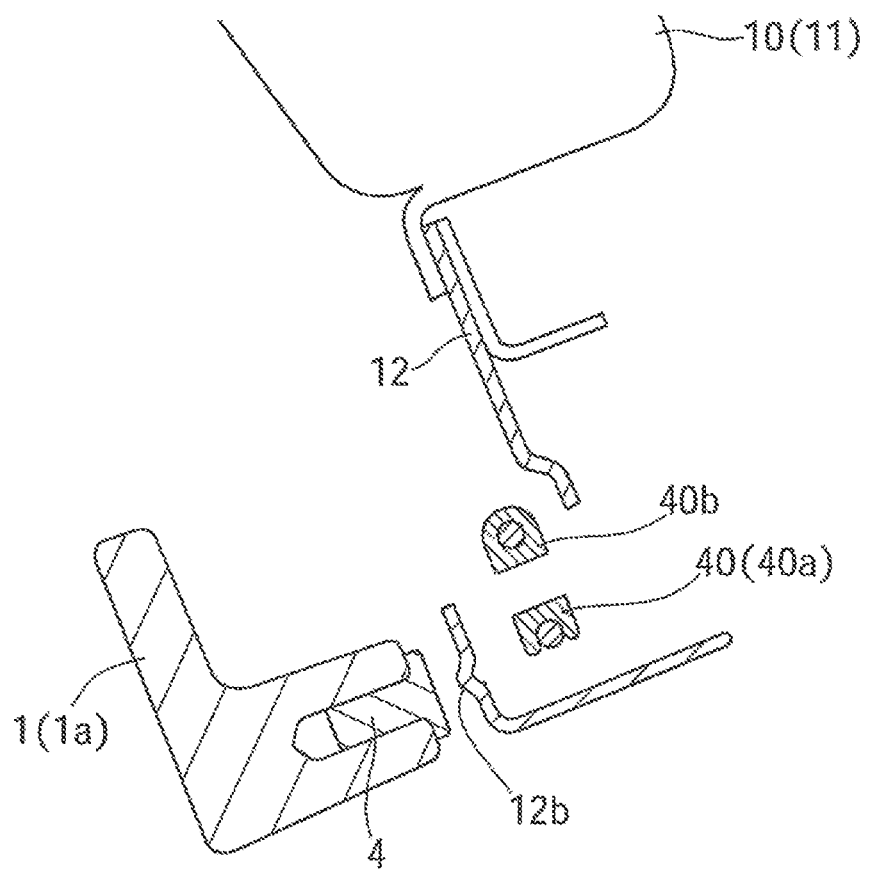
FIG. 7 is a side cross-sectional view in a horn sensor portion in the state shown in FIG. 6.

Thereby, the operation of assembling the airbag module 10 to the core metal 1 of the steering wheel is completed. That is, by the snap-in method of inserting the hook member 2 into the mounting hole 12a (damper rubber 20), the airbag module 10 can be easily mounted on the steering wheel. In this state, the rod-shaped portion 40a of the lock spring 40 faces the flat surface 2b of the hook member 2. This rod-shaped portion 40a functions as a rotation stop of the hook member 2. The lock spring 40 is disposed with a gap with respect to the mounting plate 12 of the airbag module 10 in an axial direction and a radial direction of the hook member 2 (see FIGS. 6 to 8). In other words, the lock spring 40 is mounted on the guide member 30 in a state where the lock spring 40 is not in contact with the mounting plate 12.

Figure 9:
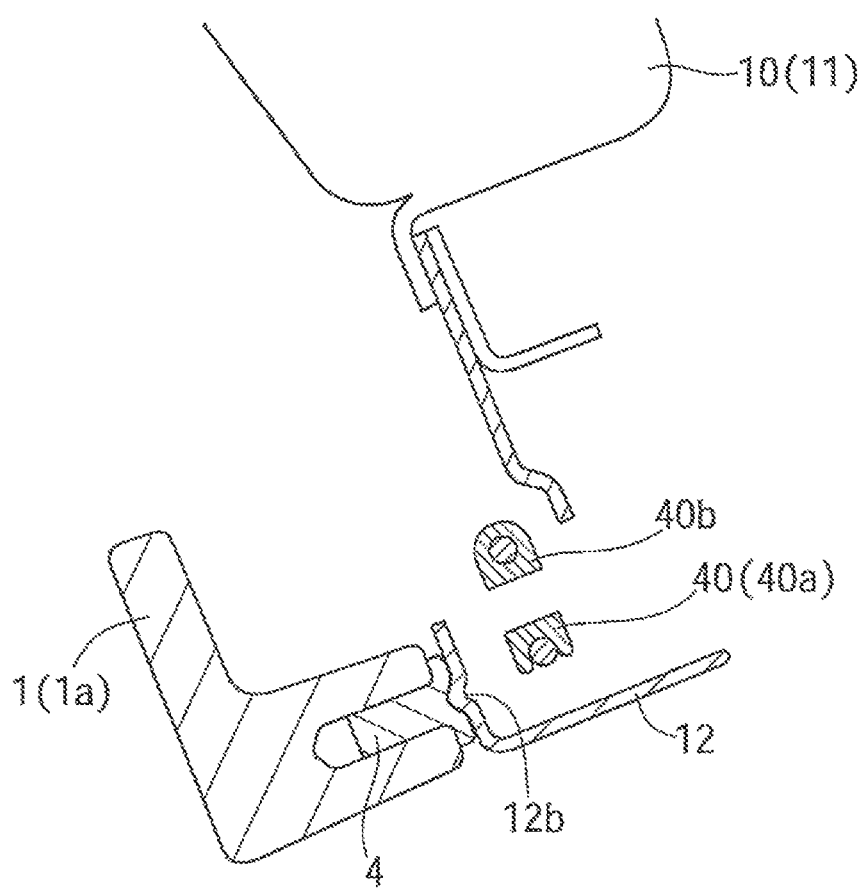
FIG. 9 is a side cross-sectional view in a horn sensor portion in the state shown in FIG. 8.

The airbag module 10 is relatively displaceable only in a predetermined range in the axial direction of the hook member 2. However, by a biasing force of the return spring 3, normally, the airbag module 10 is located in a stroke end on a rear side of the airbag module 10 (see FIGS. 6 and 7). When in this state, a driver performs an pressing operation (operation of pressing forward) of the airbag module 10 against the biasing force of the return spring 3, the airbag module 10 moves forward as shown in FIG. 8, and a pressing portion 12b (see FIG. 9) provided in the mounting plate 12 abuts on the horn sensor 4 provided on the steering wheel side. This operates a horn to generate alarm sound.

When the steering wheel vibrates during traveling, a dynamic damper function utilizing elasticity of the damper rubber 20 and a mass of the airbag module 10 as a mass body is exerted to reduce the vibration of the steering wheel. In addition, in the present embodiment, since the gap between the mounting plate 12 and the lock spring 40 is formed, the vibration of the steering wheel is prevented from being transmitted to the airbag module 10 from the hook member 2 (guide member 30 covering this) through the lock spring 40. A synergistic effect by the above-described effect and the dynamic damper function utilizing the elasticity of the damper rubber 20 and the like can more increase the effect of reducing the vibration.

The spacer 21 can exert a function of suppressing excessive vibration of the damper rubber 20. This can prevent the damper rubber 20 from being needlessly elastically deformed in the diameter-expanding direction, so that the dynamic damper function can be effectively exerted.

When the airbag module 10 operates due to collision of the vehicle, the air bag is inflated and deployed toward the driver. At this time, the guide member 30 prevents the deployed air bag from directly abutting on the distal end of the hook member 2. In the present embodiment, the guide member 30 formed with the opening 31c in a top portion of the main body 31 is used, and this makes insertion operation smooth by removing air inside the main body 31 when the hook member 2 is inserted into the main body 31. However, a case where the above-described measures are not particularly necessary, the formation of the opening 31c may be omitted.

Here, the spacer 21 is not essential, but may be omitted. In the case where the spacer 21 is omitted, for example, it can be considered that the mounting hole 12a is formed tubularly, and that the damper rubber 20 is mounted on an inside thereof. This allows an inner circumferential surface of the mounting hole to function as the spacer 21 as well.

As is evident from the above description, in the present embodiment, parts required for both the mounting by the snap-in method and the dynamic damper function are five parts in total of the hook member 2, the damper rubber 20, the spacer 21, the guide member 30, and the lock spring 40. Furthermore, if the spacer 21 is omitted, the four required parts suffices.

Figure 15:
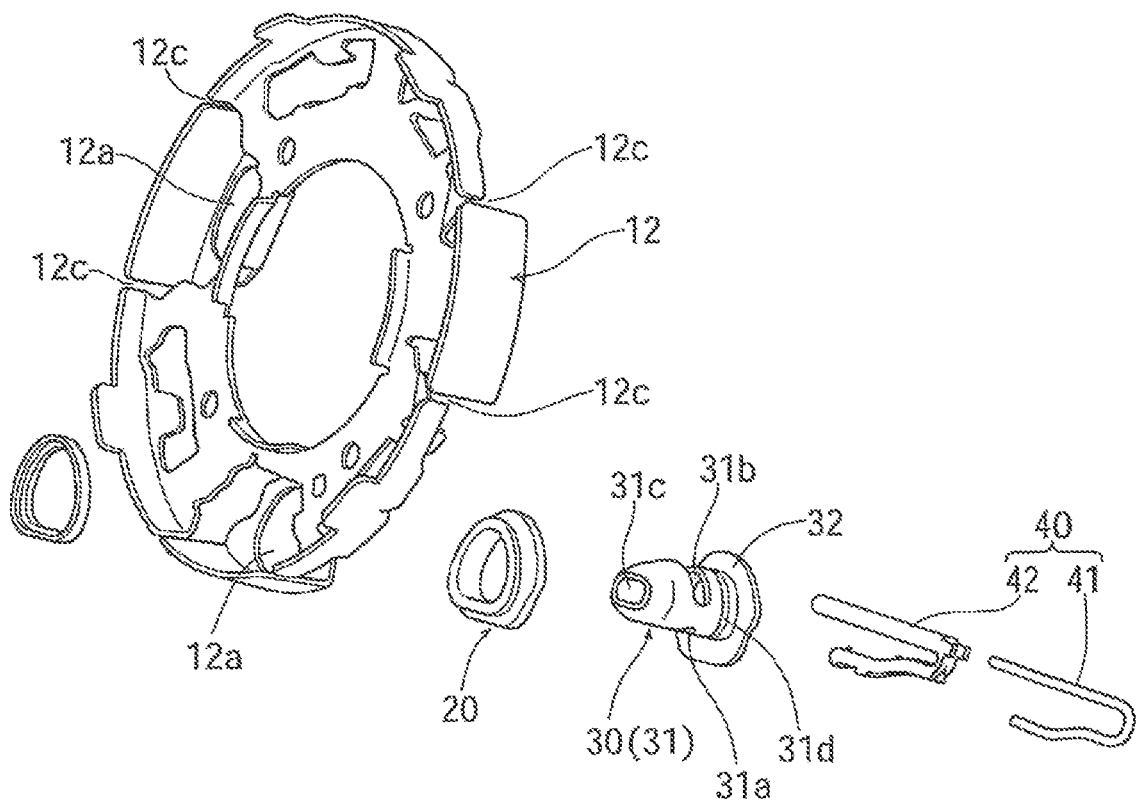
FIG. 15 is an exploded perspective view showing a second embodiment of the present invention, and corresponding to FIG. 4.
Figure 16:
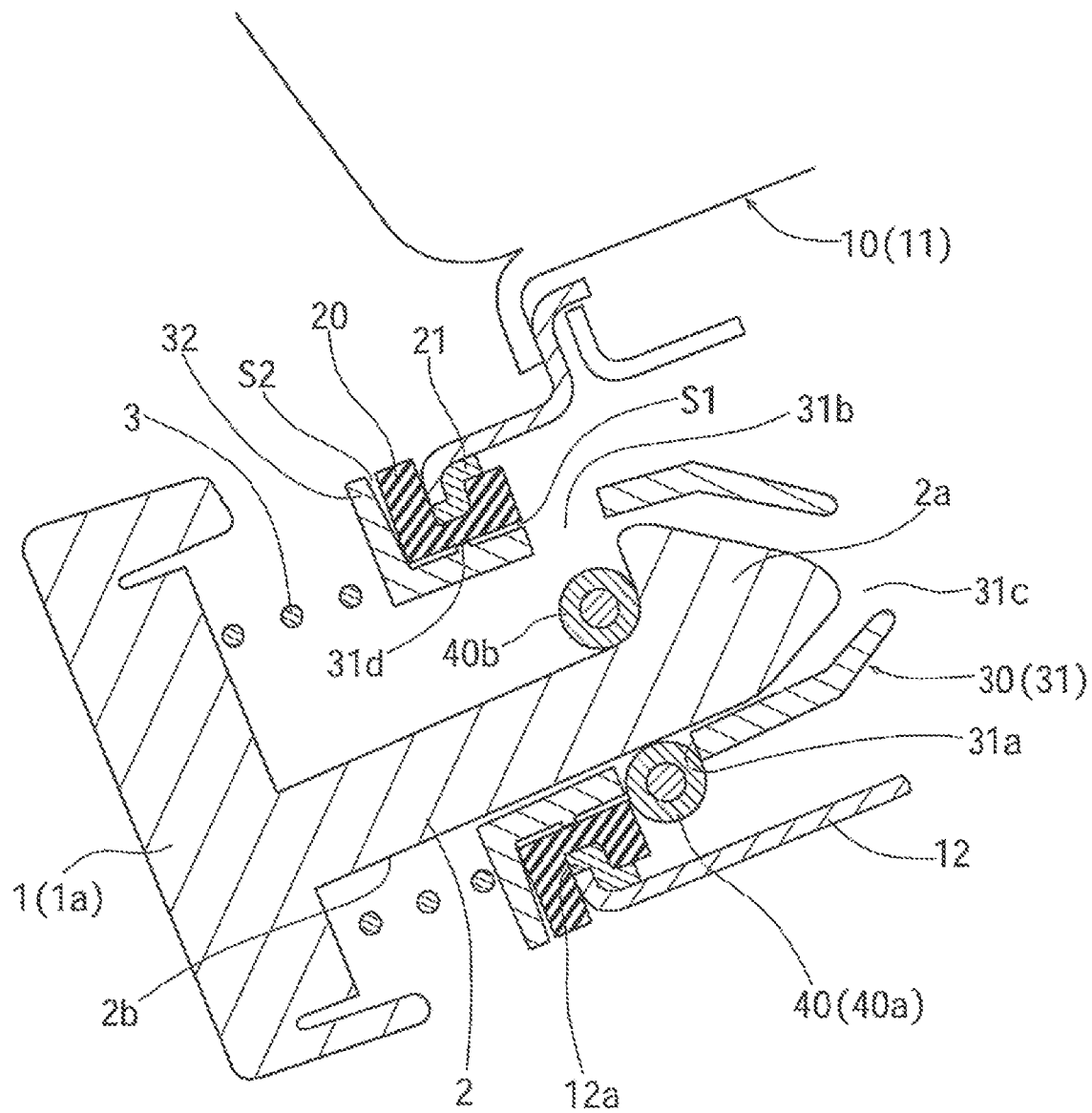
FIG. 16 is a side cross-sectional view showing the second embodiment of the present invention, and corresponding to FIG. 6.

FIGS. 15 and 16 show a second embodiment of the present invention, and the same component as the foregoing embodiment is denoted by the same reference sign, and an overlapped description is omitted. In the present embodiment, an annular projecting portion 31d is formed in an entire circumference of an outer circumferential surface of the main body 31 in the guide member 30. This projecting portion 31d abuts on an inner circumferential surface of the damper rubber 20, by which positioning of the guide member 30 is accurately performed.

Gaps S1 are formed between the outer circumferential surface of the main body 31 and the inner circumferential surface of the damper rubber 20. The gap S1 are formed in front of, and at the rear of the projecting portion 31d, respectively. The formation of these gaps S1 can expand a movable range of the damper rubber 20, and enhance dynamic damper performance. It is preferable that as to a formation position of the projecting portion 31d, the projecting portion 31d is formed substantially at a middle position in an axial direction of the damper rubber 20. Thereby, the gaps S1 each having a substantially equal length in the axial direction of the damper rubber 20 are formed with the projecting portion 31d as a center. In the present embodiment, in an outer circumferential edge portion of the mounting plate 12, a plurality of slits 12c are formed at intervals in a circumferential direction.

In the present embodiment, a gap S2 is formed between the flange 32 of the guide member 30, and the damper rubber 20. That is, a rear surface of the flange 32 opposed to the damper rubber 20 is inclined so as to become gradually apart from the damper rubber 20 toward a radially outside, by which the gap S2 having a wedge shape is formed between the flange 32 and the damper rubber 20. The formation of this gap S2 can expand the movable range of the damper rubber 20, and enhance the dynamic damper performance.

While the embodiments have been described above, the present invention is not limited to the embodiments, but appropriate modifications can be made within a range described in the claims. For example, the damper rubber 20 may be fitted on the outer circumference of the guide member 30. In this case, it can be considered that an annular holding groove is formed in the outer circumference of the guide member 30, and that the damper rubber 20 is fitted in this holding groove. The hook member 2 may be configured of a separate member from the core metal 1, and this hook member 2 may be fixed to the core metal 1 by a fixture. The guide member 30 may have a shape that does not cover the enlarged distal end 2a of the hook member 2.

An object of the present invention is not limited to one set forth, and also implicitly includes provision of one substantially preferable or expressed as an advantage.

SUMMARY OF EMBODIMENTS

A summary of the above-described embodiments is as follows.

The steering wheel structure includes: the guide member that is formed into a tubular shape, and attached to the mounting hole formed in the mounting plate of the airbag module; the hook member that is formed in the steering wheel and is inserted into the guide member; the damper rubber that is interposed between the edge portion of the mounting hole in the mounting plate, and the guide member; and the lock spring that is attached to the guide member. The lock spring is engaged with the hook member inserted into the guide member so as to prevent the hook member from coming-off from the guide member.

According to the steering wheel structure, the hook member is inserted into the guide member, by which the lock spring is engaged with the hook member, and the lock spring prevents the coming-off of the hook member. That is, the airbag module can be easily mounted on the steering wheel by the snap-in method. During traveling, the dynamic damper function utilizing the elasticity of the damper rubber and the mass of the airbag module as a mass body can reduce the vibration of the steering wheel. In addition, since as described above, the number of parts required for both mounting by the snap-in method and the dynamic damper function can be made small, simplification of the structure can be achieved. Particularly, since the guide member into which the hook member is inserted can be used as a member holding the lock spring as well, the simplification of the structure can be further promoted.

Preferably, in the state where the lock spring is engaged with the hook member, the gap for bringing the lock spring and the mounting plate into non-contact with each other is formed between the lock spring and the mounting plate.

According to this configuration, the vibration of the steering wheel can be prevented from being transmitted to the airbag module from the hook member through the lock spring, so that the effect of reducing the vibration can be more enhanced.

Preferably, the guide member has the main body and the flange, the main body being insertable into the damper rubber from the steering wheel side, and the flange being formed on one end of the main body, and abutting on the edge portion of the mounting hole on the steering wheel side. The lock spring is attached to the main body of the guide member at the position on the opposite side to the flange with the mounting plate interposed. The movement of the guide member in the axial direction of the mounting hole is prevented by the flange and the lock spring to thereby keep the main body from coming off from the mounting hole.

According to this configuration, by effectively utilizing the lock spring, that is, without using another member such as a separate fixture, the guide member can be kept mounted at the predetermined position.

Preferably, the lock spring has the pair of rod-shaped portions opposed to each other, and the connecting portion that connects one ends of the pair of rod-shaped portions. The lock spring is attached to the guide member in the state where at least one of the pair of rod-shaped portions penetrates the guide member. In the state where the hook member inserted into the guide member goes over the pair of rod-shaped portions while elastically deforming the pair of rod-shaped portions so as to widen the interval between the pair of rod-shaped portions, the lock spring prevents the hook member from coming-off from the guide member by the pair of rod-shaped portions whose interval is narrowed by the elastic restoring force.

According to this configuration, by utilizing the pair of rod-shaped portions, which changes the interval by the elastic deformation, the coming-off of the hook member can be easily and surely prevented.

Preferably, of side surfaces of the hook members, at least one surface facing the lock spring is formed into a flat surface.

According to this configuration, since the lock spring functions as a rotation stop of the hook member, the state where the lock spring is engaged with the hook member can be surely maintained.

Preferably, in the state where the lock spring is engaged with the hook member, the distal end of the hook member is covered with the guide member.

According to this configuration, the effective utilization of the guide member can prevent a situation where the air bag expanded and deployed comes into contact with the distal end of the hook member.

Preferably, the steering wheel structure further includes the spacer that is fitted on the outer circumference of the damper rubber, and regulates elastic deformation of the damper rubber in the direction where the diameter of the damper rubber is expanded.

According to this configuration, the excessive vibration of the damper rubber can be suppressed by the spacer. This can prevent the damper rubber from being needlessly elastically deformed or displaced in the diameter-expanding direction, so that the dynamic damper function can be effectively exerted.

Preferably, in the state where the lock spring is engaged with the hook member, the airbag module is displaceable within the predetermined range in the axial direction of the hook member. The steering wheel structure further includes the return spring that biases the airbag module in the direction where the airbag module is apart from the steering wheel.

According to this configuration, since the horn is not operated unless the airbag module is subjected to pressing operation by a predetermine or more force, malfunction of the horn can be prevented.

Preferably, in the outer circumferential surface of the main body of the guide member, the projecting portion that abuts on the inner circumferential surface of the damper rubber is formed, and the projecting portion allows the gap to be formed between the main body and the damper rubber.

According to this configuration, positioning of the guide member can be accurately performed by utilizing the projecting portion. Moreover, since a movable range of the damper rubber is expanded, the dynamic damper performance can be enhanced.

Preferably, the gap is formed between the flange and the damper rubber opposed to the flange.

According to this configuration, the movable range of the damper rubber is expanded, and the dynamic damper performance can be enhanced.

The invention claimed is:

1. A steering wheel structure including a steering wheel and an airbag module mounted on the steering wheel, the steering wheel structure comprising:
   a guide member that is formed into a tubular shape, and inserted into a mounting hole formed in a mounting plate of the airbag module so as to be attached to the mounting plate;
   a hook member that is formed on the steering wheel, and is inserted into the guide member;
   a damper rubber that is interposed between an edge portion of the mounting hole in the mounting plate, and the guide member; and
   a lock spring that is attached to the guide member; the lock spring has a pair of rod-shaped portions opposed to each other;
   the guide member includes two holding holes, each of the two holding holes is configured to receive a respective one of the pair of rod-shaped portions therein;
   wherein the lock spring is engaged with the hook member inserted into the guide member so as to prevent the hook member from coming-off from the guide member.

2. The steering wheel structure according to claim 1, wherein in a state where the lock spring is engaged with the hook member, a gap for bringing the lock spring and the mounting plate into non-contact with each other is formed between the lock spring and the mounting plate.

3. The steering wheel structure according to claim 1,
   wherein the guide member has a main body and a flange, the main body being insertable into the damper rubber from a steering wheel side, and the flange being formed on one end of the main body adjacent an edge portion of the mounting hole on the steering wheel side,
   the lock spring is attached to the main body of the guide member at a position on an opposite side to the flange with the mounting plate interposed, and
   movement of the guide member in an axial direction of the mounting hole is prevented by the flange and the lock spring to thereby keep the main body from coming off from the mounting hole.

4. The steering wheel structure according to claim 3, wherein in an outer circumferential surface of the main body of the guide member, a projecting portion that abuts on an inner circumferential surface of the damper rubber is formed, and the projecting portion allows a gap to be formed between the main body and the damper rubber.

5. The steering wheel structure according to claim 4, wherein a gap is formed between the flange and the damper rubber opposed to the flange.

6. The steering wheel structure according to claim 3, wherein a gap is formed between the flange and the damper rubber opposed to the flange.

7. The steering wheel structure according to claim 1,
wherein the lock spring includes a connecting portion that connects the pair of rod-shaped portions,
in a state where the hook member is inserted into the guide member, the hook member goes over the pair of rod-shaped portions while elastically deforming the pair of rod-shaped portions so as to widen an interval between the pair of rod-shaped portions, the lock spring prevents the hook member from coming-off from the guide member by narrowing the interval between the pair of rod-shaped portions by an elastic restoring force.

8. The steering wheel structure according to claim 1, wherein of side surfaces of the hook member, at least one surface facing the lock spring is formed into a flat surface.

9. The steering wheel structure according to claim 1, wherein in the state where the lock spring is engaged with the hook member, a distal end of the hook member is covered with the guide member.

10. The steering wheel structure according to claim 1, further comprising a spacer that is fitted on an outer circumference of the damper rubber, and regulates elastic deformation of the dumper rubber in a direction where a diameter of the damper rubber is expanded.

11. The steering wheel structure according to claim 1,
wherein in the state where the lock spring is engaged with the hook member, the airbag module is displaceable within a predetermined range in an axial direction of the hook member, and
the steering wheel structure further comprises a return spring that biases the airbag module in a direction where the airbag module is apart from the steering wheel.

* * * * *